Sept. 22, 1936. M. E. BARKER 2,055,060
PROCESS FOR ACCELERATING THE AGING OF DISTILLED ALCOHOLIC SPIRITS
Filed Aug. 23, 1934
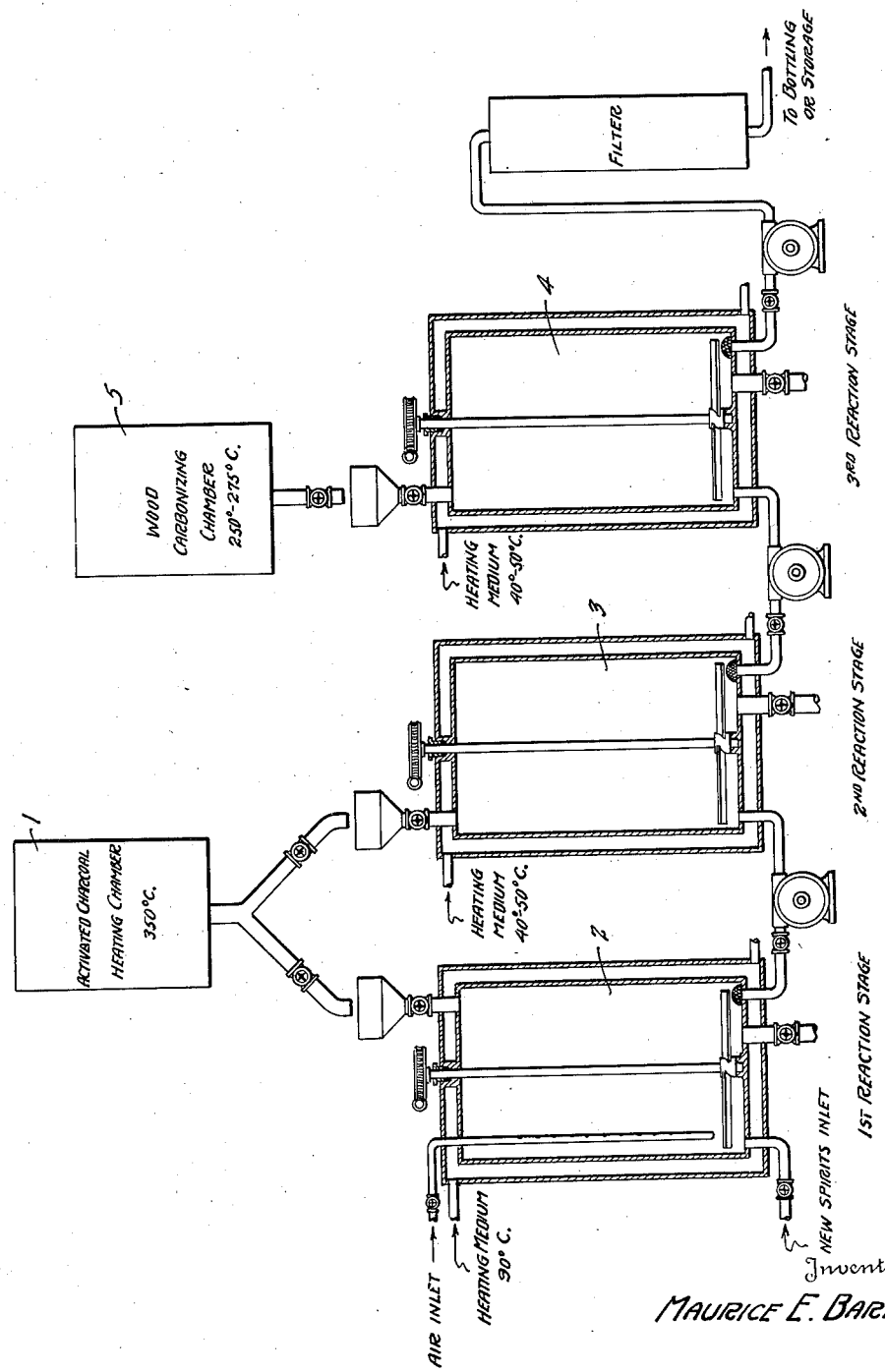
Inventor
MAURICE E. BARKER
By Semmes & Semmes
Attorneys Patented Sept. 22, 1936

2,055,060

UNITED STATES PATENT OFFICE 2,055,060

PROCESS FOR ACCELERATING THE AGING OF DISTILLED ALCOHOLIC SPIRITS

Maurice E. Barker, Edgewood, Md., assignor of one-fifth to Semmes and Semmes, Washington, D. C., a firm consisting of Harry H. Semmes and S. Warwick Keegin Application August 23, 1934, Serial No. 741,166

1 Claim. (Cl. 99—48)

This invention relates to the aging of spiritous liquors and more particularly has reference to a process for the acceleration of such aging.

Freshly distilled liquors have a burning and unpleasant taste which results from the presence of certain acids and aldehydes and higher alcohols. The stirring of such liquors for prolonged periods of time in contact with ordinary unactivated charcoal causes the aldehydes to slowly oxidize to acids, and the acids react with the alcohols to form esters. This gives to the liquors the pleasant taste desirable in high grade products.

While various treatments have been suggested to accelerate these reactions, the prior art has been open to certain objections. In general, such previous processes have been relatively tedious and expensive, and the finished product is frequently and readily distinguished from the liquors which have been aged in the normal manner.

To overcome the above objections is one of the objects of my invention.

Another object of the invention is to devise an economical and efficient process for the accelerated aging of spiritous liquors.

Yet another object of my invention is to provide a relatively simple process for the accelerated aging of liquors, which may be carried out with a minimum of equipment.

A still further object of my invention is to provide a process for the aging of liquors in a relatively short period of time, and in which the product is comparable to liquors aged in the normal manner.

To accomplish the above and other important objects, as will more fully appear herein, my invention consists in the steps and combinations of steps to be hereinafter set forth and claimed, with the understanding that the several steps comprising my invention may be varied without departing from the spirit and scope of the appended claim.

Although my invention may be practiced with a minimum of equipment, I have shown in the accompanying drawing a side elevation partly in section of one apparatus which I have found to be particularly efficacious in carrying out my invention.

It is to be distinctly understood, however, that various modifications may be made therein without departing from my invention.

In general, I have found that the natural aging process is greatly accelerated when freshly distilled liquors, for example, whisky of 80 to 120 proof, are heated in contact with an activated or partly activated charcoal, to which a little air is admitted, such charcoal acting as a catalyst to produce a reaction in one hour that is equivalent to natural aging of at least one year. Although various types of charcoal may be employed, I have found that charcoal such as that described in my U. S. Patents 1,902,986 and 1,933,579, is particularly efficacious. When such charcoal has become inactive as a catalyst, it may be reactivated according to the process described in my Patent No. 1,933,579, for initial activation. As stated, however, other types of charcoal or methods of activation may be employed.

More specifically, and referring to the drawing, charcoal in the form of granules of various sizes may be heated in a chamber 1 at a temperature of about 350° C., in air or flue gases for approximately one hour. The liquor is introduced to a suitable receptacle 2 which may be jacketed or otherwise heated, and in which the contents are kept at a temperature of approximately 90° C. The receptacle 2 serves as the first stage of the process.

The activated charcoal is fed to the receptacle 2 at the rate of 1 pound of charcoal to from two to five gallons of liquor. The liquor and charcoal are gently stirred at the 90° C. temperature for a period of approximately three hours, and a small amount of air is admitted from time to time through a suitable air inlet. In this first reaction stage the aldehydes and the liquor are partially oxidized to acids.

Upon oxidation of the aldehydes the liquor is passed to a second receptacle 3 which may be similar in all respects to receptacle 2 except for the fact that in the second receptacle no air is admitted. The liquor, upon reaching the receptacle 3, is partially aged, and as above stated, has been oxidized so that the aldehydes have been converted to acids. The contents of the receptacle 3 are kept at a temperature of from 40 to 50° C., and activated charcoal is introduced at the same rate as in the case of the chamber 2—namely, 1 pound of charcoal to from 2 to 5 gallons of liquor. In this stage also there is gentle agitation by the stirrers as shown in the drawing, or in any other suitable manner. The liquor is maintained in the second stage for a period of about six hours. This causes the acids present to react with the alcohols to form esters.

In the first two stages the color is rather completely removed, the liquor is lacking in certain complex sugars, and there is a certain amount of organic matter carried in suspension in the liquor. To correct this I provide a third stage in which the liquor is treated in a receptacle 4 which may be similar in all respects to receptacle 3.

In this third stage I employ a charcoal made by carbonizing or distilling oak or similar wood in the chamber 5. The wood is held in this chamber for a period of three hours at a temperature of from 250 to 275° C., which is sufficient to decompose the wood with the evolution of heat.

The charcoal in chamber 5 is introduced to the liquor in receptacle 4 at the rate of 1 pound of charcoal to from 2 to 5 gallons of liquor, and the liquor and charcoal are agitated at a temperature of from 40 to 50° C., for a period of approximately six hours. As stated above, the liquor in this stage has added to it certain complex sugars, some of its color is restored, and the suspended organic matter is flocculated.

When wood is carbonized at 250–275° C., certain definite chemical changes take place and a continuous exothermal reaction is produced. The lignin, cellulose and other components of the wood are destroyed and primary charcoal, sugars of the polysacchride ($C_6H_{10}O_5$) X group, and certain coloring materials are produced. During the last stage of the process of liquor aging, the complex sugars of the polysacchride group and the coloring matter are extracted from the charcoal by the liquor.

If desired, the liquor from the third stage may be treated with coloring matter, may be filtered, and then passed to a bottling or storage stage.

It will, of course, be apparent that various changes may be made in the ratio of charcoal to liquor, in the temperature and time of treatment all according to the quality of the product desired. It will also be appreciated that various details may be varied without departing from the spirit of the invention or exceeding the claim by which alone I wish to be bound.

I claim:

A process of aging freshly distilled spiritous liquors, comprising agitating the liquor with activated charcoal at the rate of one pound of charcoal to from two to five gallons of liquor, and at a temperature of substantially 90° C., admitting small quantities of air during such agitation, thereby converting aldehydes into acids, then further agitating the treated liquor with a similar quantity of activated charcoal at a temperature of 40 to 50° C. in the absence of air, thereby converting acids into esters, and then heating the thus treated liquor in the presence of charcoal prepared by distilling wood at 250 to 275° C., thereby adding color and flavor to said liquor.

MAURICE E. BARKER.